(12) United States Patent
Fisher et al.

(10) Patent No.: US 10,944,591 B2
(45) Date of Patent: Mar. 9, 2021

(54) AUTOMATICALLY SETTING A CLOCK OF A NETWORK-CONNECTED APPARATUS

(71) Applicant: ELECTROLUX HOME PRODUCTS, INC., Charlotte, NC (US)

(72) Inventors: James Fisher, Charlotte, NC (US); Matthew David McClellan, Conover, NC (US)

(73) Assignee: Electrolux Home Products, Inc., Charlotte, NC (US)

( * ) Notice: Subject to any disclaimer, the term of this patent is extended or adjusted under 35 U.S.C. 154(b) by 1083 days.

(21) Appl. No.: 14/883,192

(22) Filed: Oct. 14, 2015

(65) Prior Publication Data
US 2017/0111459 A1    Apr. 20, 2017

(51) Int. Cl.
| | |
|---|---|
| *G06F 15/17* | (2006.01) |
| *H04L 12/64* | (2006.01) |
| *G04R 20/18* | (2013.01) |
| *D06F 33/00* | (2020.01) |
| *D06F 58/30* | (2020.01) |
| *D06F 103/00* | (2020.01) |
| *D06F 103/38* | (2020.01) |

(52) U.S. Cl.
CPC .......... *H04L 12/6418* (2013.01); *G04R 20/18* (2013.01); *D06F 33/00* (2013.01); *D06F 58/30* (2020.02); *D06F 2103/00* (2020.02); *D06F 2103/38* (2020.02); *D06F 2212/02* (2013.01)

(58) Field of Classification Search
CPC ............... H04L 29/08072; H04L 29/06; H04L 12/6418; H04L 12/00; G04R 20/18; D06F 2103/38; D06F 33/00

USPC .......................... 709/203, 220, 225, 228, 224
See application file for complete search history.

(56) References Cited

U.S. PATENT DOCUMENTS

| | | | |
|---|---|---|---|
| 6,577,231 B2 | 6/2003 | Litwin, Jr. et al. | |
| 6,587,739 B1 | 7/2003 | Abrams et al. | |
| (Continued) | | | |

FOREIGN PATENT DOCUMENTS

| | | |
|---|---|---|
| EP | 2 860 296 | 4/2015 |
| JP | 2004286612 A | 10/2004 |
| (Continued) | | |

OTHER PUBLICATIONS

International Search Report dated Jan. 18, 2017 in corresponding International Application No. PCT/US2016/057049 filed Oct. 14, 2016.

*Primary Examiner* — Khanh Q Dinh
(74) *Attorney, Agent, or Firm* — Womble Bond Dickinson (US) LLP

(57) ABSTRACT

An apparatus is provided that includes a processor and a memory storing executable instructions that in response to execution by the processor cause the apparatus to at least perform a number of operations. The apparatus is caused to receive time information over a packet-switched computer network, with the time information including a current standard time, time-zone offset and timestamps that define a predetermined timeframe. The apparatus is caused to calculate a current local time from the current standard time and time-zone offset, and including an adjustment of the current local time in instances in which the timestamps indicate that the current standard time is within the predetermined timeframe. And the apparatus is caused to cause a clock to be set to the current local time.

15 Claims, 3 Drawing Sheets

(56) References Cited

U.S. PATENT DOCUMENTS

| | | | |
|---|---|---|---|
| 6,904,160 B2* | 6/2005 | Burgess | G06F 16/29 |
| | | | 382/113 |
| 7,069,091 B2 | 6/2006 | Williamson | |
| 7,133,739 B2 | 11/2006 | Williamson et al. | |
| 7,151,968 B2 | 12/2006 | Williamson | |
| 7,506,023 B2* | 3/2009 | Keohane | G06F 1/14 |
| | | | 709/203 |
| 8,891,504 B2* | 11/2014 | Fellman | H04L 12/6418 |
| | | | 370/341 |
| 8,970,422 B2* | 3/2015 | Washlow | G01S 7/003 |
| | | | 342/20 |
| 9,106,452 B2* | 8/2015 | Basart | H04M 7/0057 |
| 9,135,818 B2* | 9/2015 | Washlow | G01S 7/02 |
| 2002/0044690 A1* | 4/2002 | Burgess | G06F 16/29 |
| | | | 382/209 |
| 2003/0080113 A1 | 5/2003 | Williamson | |
| 2003/0083770 A1 | 5/2003 | Williamson | |
| 2003/0233479 A1* | 12/2003 | Keohane | G06F 1/14 |
| | | | 709/248 |
| 2005/0105399 A1 | 5/2005 | Strumpf et al. | |
| 2007/0055387 A1 | 3/2007 | Williamson | |
| 2013/0021170 A1* | 1/2013 | Anderson | G08G 1/0116 |
| | | | 340/905 |
| 2013/0104221 A1* | 4/2013 | Low | H04W 4/08 |
| | | | 726/9 |
| 2014/0089719 A1 | 3/2014 | Daum | |
| 2015/0067819 A1* | 3/2015 | Shribman | H04L 67/06 |
| | | | 726/12 |
| 2015/0113098 A1* | 4/2015 | VanBuskirk | G06Q 10/00 |
| | | | 709/217 |
| 2015/0295669 A1* | 10/2015 | Chapman | H04L 5/0007 |
| | | | 370/503 |
| 2015/0295998 A1* | 10/2015 | Morrill | H04L 29/06027 |
| | | | 709/203 |

FOREIGN PATENT DOCUMENTS

| | | |
|---|---|---|
| JP | 200833429 A | 2/2008 |
| WO | 2006/135758 | 12/2006 |
| WO | 2011/038130 | 3/2011 |

* cited by examiner

AUTOMATICALLY SETTING A CLOCK OF A NETWORK-CONNECTED APPARATUS

TECHNOLOGICAL FIELD

The present disclosure relates generally to network-connected apparatuses and, in particular, to automatically setting a clock of a network-connected apparatus.

BACKGROUND

In recent years, there has been rapid advancement in low-cost home networking solutions as well as increasing consumer sophistication in deploying and maintaining home local area networks (LANs), such as wireless LANs (WLANs). As a result, home LANs are now ubiquitous and an increasing number of consumer products now offer networking capability supporting connectivity to a home LAN. Progress also continues to be made toward the conceptual "connected home" in which a multitude of consumer devices within a home are interconnected via a network for purposes of information sharing and automation among multiple devices in a home. For example, many household appliances now offer network connectivity supporting connectivity to a home LAN as well as communication with devices outside the home LAN via a wider area network such as the Internet.

BRIEF SUMMARY

Example implementations of the present disclosure provide improved apparatuses and methods for provisioning an appliance for network connectivity. The present disclosure includes, without limitation, the following example implementations:

Example Implementation 1: An apparatus comprising a processor and a memory storing executable instructions that in response to execution by the processor cause the apparatus to at least receive time information over a packet-switched computer network, the time information including a current standard time, time-zone offset and timestamps that define a predetermined timeframe; calculate a current local time from the current standard time and time-zone offset, and including an adjustment of the current local time in instances in which the timestamps indicate that the current standard time is within the predetermined timeframe; and cause a clock to be set to the current local time.

Example Implementation 2: The apparatus of the preceding or subsequent example implementation, or combinations thereof, in which the apparatus is integral with or directly coupled to an appliance that includes the clock, the apparatus further comprising a real-time clock configured to be set to and keep the current standard time.

Example Implementation 3: The apparatus of any preceding or subsequent example implementation, or combinations thereof, wherein the predetermined timeframe is daylight saving time.

Example Implementation 4: The apparatus of any preceding or subsequent example implementation, or combinations thereof, wherein the apparatus being caused to calculate the current local time includes being caused to calculate the current local time without any information other than the current standard time, time-zone offset and timestamps, and without any external trigger to calculate the current local time.

Example Implementation 5: The apparatus of any preceding or subsequent example implementation, or combinations thereof, wherein the apparatus being caused to calculate the current local time includes being caused to periodically check the timestamps and identify therefrom, the instance in which the timestamps indicate that the current standard time is within the predetermined timeframe.

Example Implementation 6: The apparatus of any preceding or subsequent example implementation, or combinations thereof, wherein the instance is a first instance, and the apparatus being caused to calculate the current local time further includes a readjustment of the of the current local time subsequent to the first instance, in a second instance in which the timestamps indicate that the current standard time is outside the predetermined timeframe.

Example Implementation 7: A method comprising receiving time information over a packet-switched computer network, the time information including a current standard time, time-zone offset and timestamps that define a predetermined timeframe; calculating a current local time from the current standard time and time-zone offset, and including an adjustment of the current local time in instances in which the timestamps indicate that the current standard time is within the predetermined timeframe; and causing a clock to be set to the current local time.

Example Implementation 8: The method of the preceding or subsequent example implementation, or combinations thereof, wherein receiving the time information, calculating the current local time and causing the clock to be set are performed at an apparatus integral with or directly coupled to an appliance that includes the clock, the apparatus includes a real-time clock configured to be set to and keep the current standard time.

Example Implementation 9: The method of any preceding or subsequent example implementation, or combinations thereof, wherein the predetermined timeframe is daylight saving time.

Example Implementation 10: The method of any preceding or subsequent example implementation, or combinations thereof, wherein calculating the current local time includes calculating the current local time without any information other than the current standard time, time-zone offset and timestamps, and without any external trigger to calculate the current local time.

Example Implementation 11: The method of any preceding or subsequent example implementation, or combinations thereof, wherein calculating the current local time includes periodically checking the timestamps and identify therefrom, the instance in which the timestamps indicate that the current standard time is within the predetermined timeframe.

Example Implementation 12: The method of any preceding or subsequent example implementation, or combinations thereof, wherein the instance is a first instance, and calculating the current local time further includes a readjustment of the of the current local time subsequent to the first instance, in a second instance in which the timestamps indicate that the current standard time is outside the predetermined timeframe.

Example Implementation 13: A computer-readable storage medium that is non-transitory and has computer-readable program code portions stored therein that in response to execution by a processor, cause an apparatus to at least receive time information over a packet-switched computer network, the time information including a current standard time, time-zone offset and timestamps that define a predetermined timeframe; calculate a current local time from the current standard time and time-zone offset, and including an adjustment of the current local time in instances in which the timestamps indicate that the current standard time is within the predetermined timeframe; and cause a clock to be set to the current local time.

Example Implementation 14: The computer-readable storage medium of the preceding or subsequent example implementation, or combinations thereof, wherein the apparatus includes the computer-readable storage medium and processor, the apparatus being integral with or directly coupled to an appliance that includes the clock, the apparatus further including a real-time clock configured to be set to and keep the current standard time.

Example Implementation 15: The computer-readable storage medium of any preceding or subsequent example implementation, or combinations thereof, wherein the predetermined timeframe is daylight saving time.

Example Implementation 16: The computer-readable storage medium of any preceding or subsequent example implementation, or combinations thereof, wherein the apparatus being caused to calculate the current local time includes being caused to calculate the current local time without any information other than the current standard time, time-zone offset and timestamps, and without any external trigger to calculate the current local time.

Example Implementation 17: The computer-readable storage medium of any preceding or subsequent example implementation, or combinations thereof, wherein the apparatus being caused to calculate the current local time includes being caused to periodically check the timestamps and identify therefrom, the instance in which the timestamps indicate that the current standard time is within the predetermined timeframe.

Example Implementation 18: The computer-readable storage medium of any preceding or subsequent example implementation, or combinations thereof, wherein the instance is a first instance, and the apparatus being caused to calculate the current local time further includes a readjustment of the of the current local time subsequent to the first instance, in a second instance in which the timestamps indicate that the current standard time is outside the predetermined timeframe.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will therefore be appreciated that the above Summary is provided merely for purposes of summarizing some example embodiments so as to provide a basic understanding of some aspects of the disclosure. As such, it will be appreciated that the above described example embodiments are merely examples of some embodiments and should not be construed to narrow the scope or spirit of the disclosure in any way. It will be appreciated that the scope of the disclosure encompasses many potential embodiments, some of which will be further described below, in addition to those here summarized. Further, other aspects and advantages of embodiments disclosed herein will become apparent from the following detailed description taken in conjunction with the accompanying drawings which illustrate, by way of example, the principles of the described embodiments.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
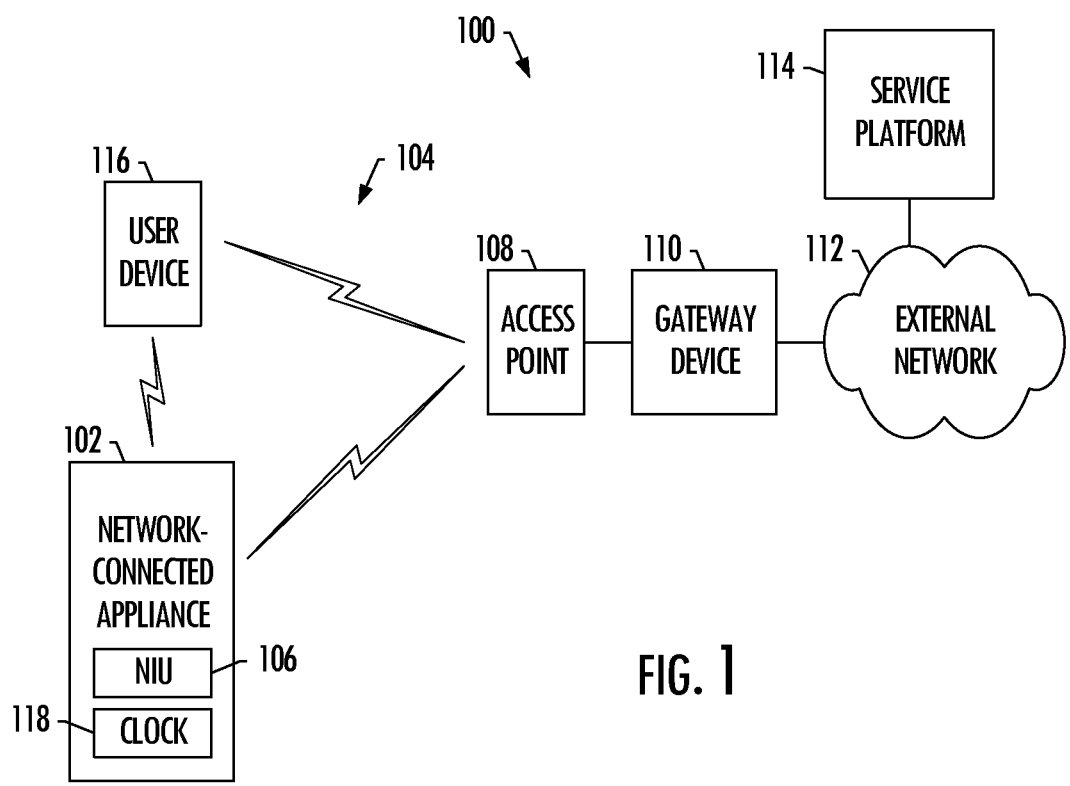
FIG. 1 is an illustration of a system according to various example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Like reference numerals refer to like elements throughout.

Example implementations of the present disclosure relate generally to network-connected apparatuses and, in particular, to automatically setting a clock of a network-connected apparatus. Example implementations may be useful for automatically setting the clock of any of a number of different network-connected apparatuses. As described herein, examples of suitable network-connected apparatuses include appliances such as dishwashers, washing machines, clothes dryers, refrigerators, freezers, ovens, ranges, cooktops, microwave ovens, trash compactors, air conditioners, water heaters or the like. It should be understood, however, that any of a number of other network-connected apparatuses may equally benefit from example implementations of the present disclosure.

FIG. 1 illustrates a system 100 for automatically setting a clock of an appliance 102, according to various example implementations of the present disclosure. According to example implementations, the appliance may be provisioned for connectivity to a packet-switched computer network such as a local area network (LAN) 104. In some examples, the appliance may include a network interface unit (NIU) 106, which may be integral with or otherwise directly connected to the appliance to enable its network connectivity.

As described herein, the LAN 104 may be a wireless LAN (WLAN) such as a WLAN implementing one or more IEEE 802.11 standards. It should be understood, however, that the LAN may additionally include or alternatively be a wired LAN such as a wired LAN implementing one or more IEEE 802.3 standards. Thus although the LAN may at times be simply referred to as a WLAN, the LAN may additionally include or alternatively be a wired LAN. Also at times, the appliance 102 may be referred to as a network-connected appliance.

The WLAN 104 may include appropriate networking hardware, some of which may be integral and others of which may be separate and interconnected. As shown, for example, the WLAN may include a wireless access point 108 configured to permit wireless devices including the appliance to connect to the WLAN. As also shown, for example, the WLAN may include a gateway device 110 such as a residential gateway configured to connect the WLAN to an external packet-switched computer network 112 such as a wide area network (WAN) like the Internet. In some examples, the wireless access point or gateway device may include an integrated router to which other systems or devices may be connected. The WLAN may also include other integral or separate and connected networking hardware, such as a network switch, hub, digital subscriber line (DSL) modem, cable modem or the like.

In some examples, the system 100 may further include a service platform 114, which may be embodied as a computer system accessible by the WLAN 104 or external network 114 (shown). The service platform may include one or more servers, such as may be provided by one or more blade servers, a cloud computing infrastructure or the like. In some examples, the service platform may be embodied as a distributed computing apparatus including multiple computing devices, such as may be used to provide a cloud computing infrastructure. And in these examples, the computing devices that form the service platform may be in communication with each other via a network such as the external network.

The service platform 114 may be configured to provide one or more services for the network-connected appliance 102 and perhaps other network-connected appliances. For example, the service platform may be operated by a manufacturer of a network-connected appliance, a vendor of a network-connected appliance or another entity that may have an interest in the manufacture, distribution or maintenance of a network-connected appliance. The service platform may enable a user to access and use various features, such as features for management of a network-connected appliance. For example, a user may be able to remotely control one or more functionalities of a network-connected appliance, monitor operation of a network-connected appliance, initiate a service request for a network-connected appliance, and/or perform other management tasks via the service platform.

In some examples, the service platform 114 may be accessible by a user device 116 over the WLAN 104 and external network 112. The user device may be embodied as any computing device configured to access the WLAN. By way of non-limiting example, the user device may be embodied as a personal computer (e.g., desktop computer, laptop computer), a mobile computing device (e.g., smart phone, tablet computer, digital camera) or the like. The user device may be configured to use any of a variety of wired or wireless (shown) network access technologies to access the WLAN.

The user device 116 may include or otherwise provide an installed application or other interface through which the service platform 114 may be accessible. This application or other interface may be or may be provided by a thin client and/or other client application, such as a web browser application through which a web page (e.g., service portal) provided by the service platform may be accessible. As another example, the application or other interface may be or may be provided by a dedicated application, such as a mobile app installed on a user device embodied as a mobile computing device.

In some examples, a user of the user device 116 may access the service platform 114 and register an account with the service platform. This may include setup of a unique identifier of the user account, such as a unique user name, email address or other identifier, as well as identification (e.g., name) and perhaps location information for the user and/or their network-connected appliance 102. In some examples, a user that has registered an account with the service platform may download an application to the user device through which the user may interact with the service platform, such as to manage the network-connected appliances via the user device. A user my log-in to access their account with the service platform via the application and perform management functions from the user device. Additionally or alternatively, for example, the application may enable the user device to recognize and communicate with the network-connected appliance directly over the WLAN 104 without going through the service platform.

Once the user has registered an account, the user may associate (e.g., register) the network-connected appliance 102 that is owned by or otherwise associated with the user to the user's account with the service platform 114, which may enable user management of the network-connected appliance via the service platform. This may include, for example, establishing an association between the user account and a unique identifier of the appliance, such as a serial number, media access control (MAC) address, part number or other identifier. The association between the user account and identifier of the network-connected appliance may be maintained by the service platform to enable it to recognize and communicate with the network-connected appliance associated with a given user account.

In some examples, the network-connected appliance 102 may be additionally or alternatively provisioned with an identifier having a predefined association with the user account. This identifier may be known to the service platform 114, and when presented to the service platform by the network-connected appliance, the service platform may recognize that the network-connected appliance is associated with the user account with which the identifier is associated. The network-connected appliance of these examples may communicate with the service platform via the WLAN 104 and external network 112, and present the identifier to indicate the user account with which the network-connected appliance is associated.

In some more particular examples, a user may select via an application on the user device 116 or via the service platform 114 to establish a new association between the network-connected appliance 102 and the user's account. In response, the service platform may generate a virtual serial number (VSN) associated with the user's account, and provision the VSN to the user device. In turn, the user device may provision the VSN to the network-connected appliance, such as via the WLAN 104. The network-connected appliance may store the VSN and present it back to the service platform to establish the association between the network-connected appliance and the user's account.

In some other examples, the user device 116 may be configured to provision their user-account identifier (e.g., user name, email address) to the network-connected appliance 102. Similar to before, the network-connected appliance may store the user-account identifier and present it to the service platform 114 to establish the association between the association between the network-connected appliance and the user's account. Further examples of suitable manners by which the user device may provision an identifier to a network-connected appliance to enable establishment of an association between the network-connected appliance and a user account are provided in PCT Patent Application No. PCT/US2014/070560, entitled: System, Method, Apparatus, and Computer Program Product for Configuring a Network Connected Appliance to Use Online Services, filed Dec. 16, 2014, the content of which is incorporated by reference in its entirety. As also further described in the '560 application, in some examples, the system 100 may further include one or more home automation systems connected to the WLAN 104 and/or external network 112, and with which the network-connected appliance may be configured to operate.

In accordance with example implementations, the network-connected appliance 102 may include a clock 118 configured to keep time. The clock may be configured to provide the time to an associated display configured to indicate the time to a user. Additionally or alternatively, in some examples, the clock may be configured to provide the time to a control component (e.g., a microprocessor, individually or as part of a microcontroller) of the appliance. The control component may be in turn configured to control one or more functionalities of the appliance based on the time. For example, the control component of an air conditioner with scheduling functionality may change the air conditioner's mode (e.g., cool, economy, fan only), temperature and/or fan speed at set scheduled time(s). In another example, the control component of a laundry, cooking or dish care appliance may start or stop a cycle of operation at set delay start or stop times. In another example, the control component of a kitchen appliance may set a timer based on the time.

In yet other examples, the control component of an appliance 102 having smart grid features may implement various functionalities such as demand-response functionalities based on the time. More particularly, for example, the control component of a freezer may be directed by the utility company to delay an energy-intensive defrost cycle of the freezer so that it starts at an off-peak time.

In accordance with example implementations, the service platform 112 may maintain or acquire a time standard such as Coordinated Universal Time (UTC), Greenwich Mean Time (GMT) or the like. The service platform may also maintain or acquire a time zone in which the connected appliance is located, which may be provided by the user or derived from location information provided by the user (e.g., the user's zip code) in setting up or managing their user account, and may be updated by the user as appropriate. This time zone may be used to identify a time-zone offset, sometimes referred to as a standard time offset (e.g., UTC offset).

Given the standard time and time zone, the service platform 112 may calculate the local time at the appliance. But if the service platform sent the local time to every network-connected appliance whenever the local changes (e.g., with daylight savings time), the required network traffic may place an undesirable burden on the service platform since there may be millions of network-connected appliances.

In accordance with example implementations, then, the service platform 112 may instead provide the NIU 106 of the network-connected appliance 102 with time information from which the NIU may itself calculate local time. The service platform may periodically provide this information to the NIU, such each time the NIU connects to the appliance. And the service platform may also confirm the information with less frequency, such as at least once a year. In some examples, the information may include:

1. The current standard time to which a real-time clock (RTC) of the NIU may be set to keep;
2. A time-zone offset (e.g., in seconds); and
3. Start and end timestamps of a predetermined timeframe such as daylight saving time for the current year.

The NIU 106 may save the information, and from it calculate current local time. The NIU may then cause the clock 118 of the appliance 102 to be set to the current local time. In some examples, the current local time may be calculated in accordance with the following:

1. Local Time=Standard Time+Time-Zone Offset; and
2. If Daylight Savings Start<Standard Time<Daylight Savings End, then Local Time=Local Time+1 hour The NIU may periodically check the timestamps and quickly update the local time in instances as daylight savings time starts and ends, and then starts again, and so forth.

In addition to reducing the burden on the service platform 112 when time changes occur, the above automatic setting of the clock 118 to the current local time may provide a number of other benefits. For example, if a municipality decides to change daylight saving time dates/times, the information may be updated at a single location (the service platform), and from there the information may be distributed to appliances in that location. The user need not manually set an appliance clock each time the appliance loses power. The clock maybe automatically and quickly updated whenever daylight savings time changes occur. And again, the service platform need not send the current local time to the appliance all the time (leading to undesirable burdens at least during instances of daylight savings changes).

In view of the above and in accordance with example implementations of the present disclosure, the NIU 106 may be configured to receive time information over a packet-switched computer network (e.g., external network 112, LAN 104). The time information may include a current standard time, time-zone offset, and timestamps that define a predetermined timeframe (e.g., daylight saving time). The NIU may calculate a current local time from the current standard time and time-zone offset, and including an adjustment of the current local time in instances in which the timestamps indicate that the current standard time is within the predetermined timeframe.

The NIU 106 may then cause a clock to be set to the current local time. As described herein, in some but perhaps not all example implementations, the NIU may be integral with or directly coupled to an appliance 102 that includes the clock 118. In some of these examples, the NIU may further include a RTC configured to be set to and keep the current standard time.

In some examples, the NIU 106 may calculate the current local time without any information other than the current standard time, time-zone offset and timestamps, and without any external trigger to calculate the current local time. The NIU may periodically check the timestamps and identify therefrom, the instance in which the timestamps indicate that the current standard time is within the predetermined timeframe. In some examples, the instance may be a first instance, and the NIU may readjust the of the current local time subsequent to the first instance, in a second instance in which the timestamps indicate that the current standard time is outside the predetermined timeframe.

Figure 2:
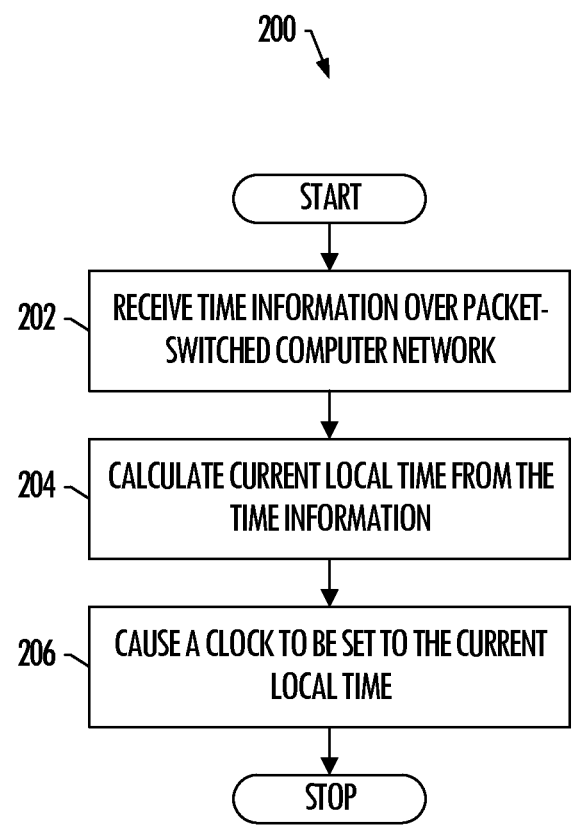
FIG. 2 is a flowchart illustrating various operations in a method according to some example implementations.

FIG. 2 is a flowchart illustrating various steps in a method 200 of automatically setting a clock, according to some example implementations of the present disclosure. As shown at 202, the method may include receiving time information over a packet-switched computer network, with the time information including a current standard time, time-zone offset and timestamps that define a predetermined timeframe. The method may include calculating a current local time from the current standard time and time-zone offset, and including an adjustment of the current local time in instances in which the timestamps indicate that the current standard time is within the predetermined timeframe, as shown at block 204. And the method may include causing a clock to be set to the current local time, as shown at block 206.

According to example implementations of the present disclosure, the system 100 and its components including the network-connected appliance 102 and user device 114 may be implemented by various means. Examples of suitable means include hardware, alone or under direction of one or more computer program code instructions, program instructions or executable computer-readable program code instructions from a computer-readable storage medium.

In some examples, one or more apparatuses may be provided that are configured to function as or otherwise implement the network-connected appliance 102 and user device 114 or various functionality thereof. In some examples, an apparatus may be provided that is configured to implement network-connectivity and clock-setting functionality of the network-connected appliance. As explained above, this apparatus may at times be referred to as a NIU 106, and it may be integral with or otherwise directly connected to the appliance to enable its network connectivity.

Figure 3:
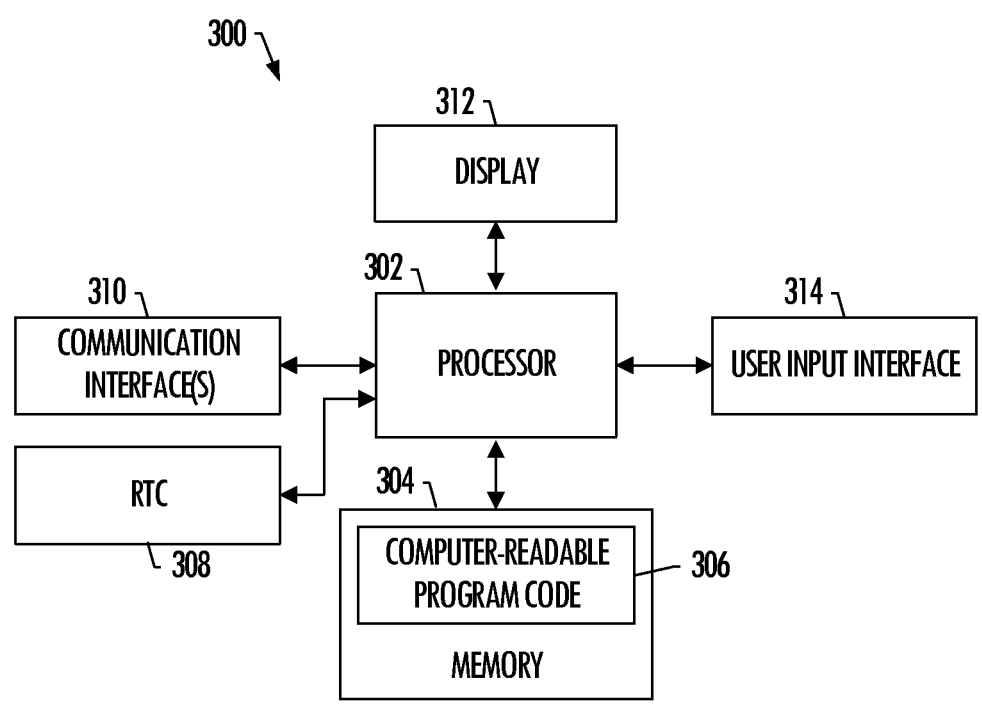
FIG. 3 illustrates an apparatus according to some example implementations.

FIG. 3 illustrates an apparatus 300 according to some example implementations of the present disclosure. In some examples, the apparatus may be configured to implement a IN integral with or otherwise directly connected to an appliance (e.g., appliance 102). In other examples, the apparatus may be configured to implement a user device (e.g., user device 114). As shown, the apparatus may include one or more of each of a number of components such as, for example, a processor 302 connected to a memory 304.

The processor 302 is generally any piece of computer hardware that is capable of processing information such as, for example, data, computer-readable program code, instructions or the like (at times generally referred to as "computer programs," e.g., software, firmware, etc.), and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 304 (of the same or another apparatus). In other examples, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 304 is generally any piece of computer hardware that is capable of storing information such as, for example, data, computer programs (e.g., computer-readable program code 306) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 304, the processor 302 may also be connected to a RTC 308 configured to keep be set to and keep the current standard time. In addition, the processor may be connected to one or more interfaces for displaying, transmitting and/or receiving information. The interfaces may include a communications interface 310 and/or one or more user interfaces. In some examples, particularly in instances in which the apparatus 300 is configured to implement a NIU, the apparatus may not include a separate user interface, and may instead interact with one provided by the appliance. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 312 and/or one or more user input interfaces 314. The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, mouse, joystick, touch-sensitive surface (e.g., touchpad, touchscreen), biometric sensor or the like.

As indicated above, program code instructions may be stored in memory, and executed by a processor, to implement functions described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 300 may include a processor 302 and a computer-readable storage medium or memory 304 coupled to the processor, where the processor is configured to execute computer-readable program code 306 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
   a real-time clock (RTC); and
   a processor and a memory storing executable instructions that in response to execution by the processor cause the apparatus to at least:
   receive time information over a packet-switched computer network, the time information including a current standard time, time-zone offset and timestamps that define a predetermined timeframe;
   set the RTC to the current standard time, the RTC configured to keep the current standard time;
   calculate a current local time from the current standard time and time-zone offset, and including an adjustment of the current local time in instances in which the timestamps indicate that the current standard time is within the predetermined timeframe; and
   automatically set a clock to the current local time,
   wherein the apparatus caused to calculate the current local time includes the apparatus caused to periodically check the timestamps and the current standard time kept by the RTC, and identify the instance in which the timestamps indicate that the current standard time is within the predetermined timeframe.

2. The apparatus of claim 1 integral with or directly coupled to an appliance that includes the clock.

3. The apparatus of claim 1, wherein the predetermined timeframe is daylight saving time.

4. The apparatus of claim 1, wherein the apparatus being caused to calculate the current local time includes being caused to calculate the current local time without any information other than the current standard time, time-zone offset and timestamps, and without any external trigger to calculate the current local time.

5. The apparatus of claim 1, wherein the instance is a first instance, and the apparatus being caused to calculate the current local time further includes a readjustment of the current local time subsequent to the first instance, in a second instance in which the timestamps indicate that the current standard time is outside the predetermined timeframe.

6. An appliance comprising: the apparatus of claim 1, and the clock, and further comprising a microprocessor configured to control functionality of the appliance based on the current local time from the clock.

7. The appliance of claim 6, wherein the appliance is an air conditioner, and the functionality includes scheduling functionality according to which the microprocessor is configured to change a mode, temperature or fan speed of the air conditioner at one or more set scheduled times.

8. The appliance of claim 6, wherein the appliance is a laundry, cooking or dish care appliance, and the microprocessor configured to control the functionality includes the microprocessor configured to start or stop a cycle of operation at a set delay start time or stop time.

9. The appliance of claim 6, wherein the appliance is a kitchen appliance, and the microprocessor configured to control the functionality includes the microprocessor configured to set a timer based on the current local time.

10. The appliance of claim 6, wherein the microprocessor configured to control the functionality includes the microprocessor configured to control demand-response functionality of the appliance based on the current local time.

11. A method comprising:
    receiving time information over a packet-switched computer network, the time information including a current standard time, time-zone offset and timestamps that define a predetermined timeframe;
    setting a real-time clock (RTC) to the current standard time, the RTC configured to keep the current standard time;
    calculating a current local time from the current standard time and time-zone offset, and including an adjustment of the current local time in instances in which the timestamps indicate that the current standard time is within the predetermined timeframe; and
    automatically set a clock to the current local time,
    wherein calculating the current local time includes periodically checking the timestamps and the current standard time kept by the RTC, and identifying the instance in which the timestamps indicate that the current standard time is within the predetermined timeframe.

12. The method of claim 11, wherein receiving the time information, calculating the current local time and causing the clock to be set are performed at an apparatus integral with or directly coupled to an appliance that includes the clock.

13. The method of claim 11, wherein the predetermined timeframe is daylight saving time.

14. The method of claim 11, wherein calculating the current local time includes calculating the current local time without any information other than the current standard time, time-zone offset and timestamps, and without any external trigger to calculate the current local time.

15. The method of claim 11, wherein the instance is a first instance, and calculating the current local time further includes a readjustment of the current local time subsequent to the first instance, in a second instance in which the timestamps indicate that the current standard time is outside the predetermined timeframe.

\* \* \* \* \*